(12) United States Patent
Ram et al.

(10) Patent No.: US 7,454,443 B2
(45) Date of Patent: Nov. 18, 2008

(54) METHOD, SYSTEM, AND PROGRAM FOR PERSONAL DATA MANAGEMENT USING CONTENT-BASED REPLICATION

(76) Inventors: Tamir Ram, 938 Pocatello Ave., Sunnyvale, CA (US) 94087; Larry Kubo, 957 Michigan Ave., San Jose, CA (US) 95125

( * ) Notice: Subject to any disclaimer, the term of this patent is extended or adjusted under 35 U.S.C. 154(b) by 157 days.

(21) Appl. No.: 10/924,403

(22) Filed: Aug. 24, 2004

(65) Prior Publication Data
US 2005/0086241 A1 Apr. 21, 2005

Related U.S. Application Data

(60) Provisional application No. 60/497,938, filed on Aug. 26, 2003.

(51) Int. Cl.
G06F 12/00 (2006.01)
G06F 17/30 (2006.01)
(52) U.S. Cl. .................. 707/200; 707/203; 707/204
(58) Field of Classification Search .............. 707/100, 707/1, 200, 203, 204, 101; 711/162; 714/746, 714/758, 819, 176; 713/194, 201, 176, 181, 713/187, 188
See application file for complete search history.

(56) References Cited

U.S. PATENT DOCUMENTS

| | | | | |
|---|---|---|---|---|
| 6,091,835 A * | 7/2000 | Smithies et al. | ............. | 382/115 |
| 6,460,163 B1 * | 10/2002 | Bowman et al. | ............. | 714/819 |
| 6,757,832 B1 * | 6/2004 | Silverbrook et al. | ......... | 713/194 |
| 6,785,786 B1 * | 8/2004 | Gold et al. | ................... | 711/162 |
| 2004/0017913 A1 * | 1/2004 | Hawkes et al. | ................. | 380/37 |
| 2004/0039912 A1 * | 2/2004 | Borrowman et al. | ........ | 713/176 |
| 2004/0098599 A1 * | 5/2004 | Bentley | ...................... | 713/187 |
| 2004/0153935 A1 * | 8/2004 | Niesen | ........................ | 714/746 |
| 2005/0091501 A1 * | 4/2005 | Osthoff et al. | .............. | 713/181 |

OTHER PUBLICATIONS

JUan Piernas, Toni Cortes and Jose M. Garcia (2002), DualFS: a New Journaling File System without Meta-Data Duplication pp. 137-146.*

* cited by examiner

*Primary Examiner*—Wilson Lee
*Assistant Examiner*—Merilyn P Nguyen
(74) *Attorney, Agent, or Firm*—Casimir Jones, S.C.

(57) ABSTRACT

Data management systems and methods that can catalog, store, and protect data from hard disk failure on a mobile or stationary computer, using a computer program and a portable data storage device are provided. The program uses a combination message-digest and check-function based algorithm that can back up, manage, and protect data independent of specific computer operating system or file system. The program can check files for block-level content changes from previously stored data blocks and catalogs and stores only new data blocks. By storing only new data blocks and cataloging information within a comprehensive, backup archive composed of these blocks, the size of each backup is reduced.

15 Claims, 4 Drawing Sheets

Figure 1. Personal Data Management System
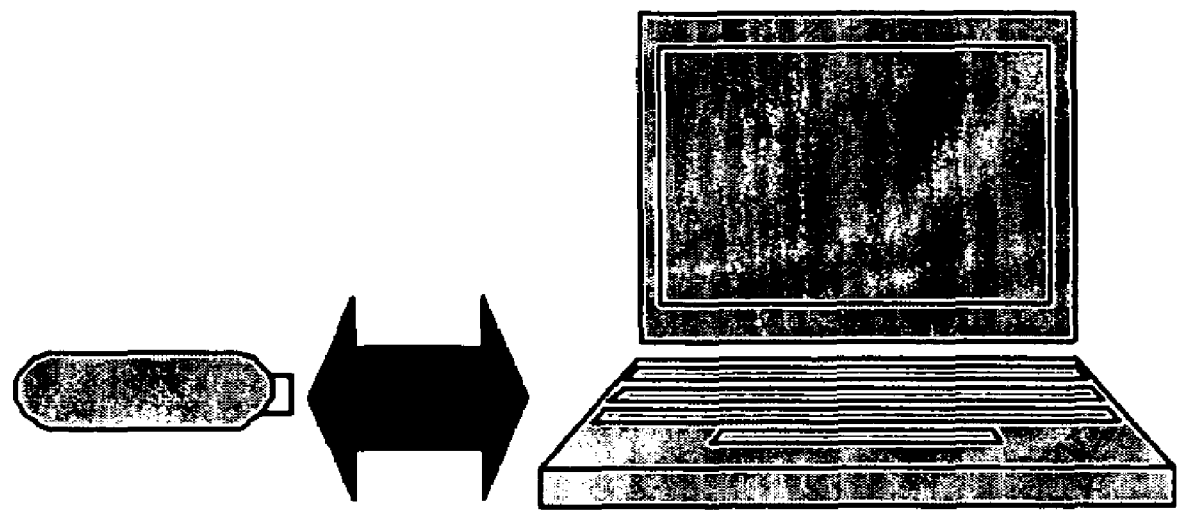

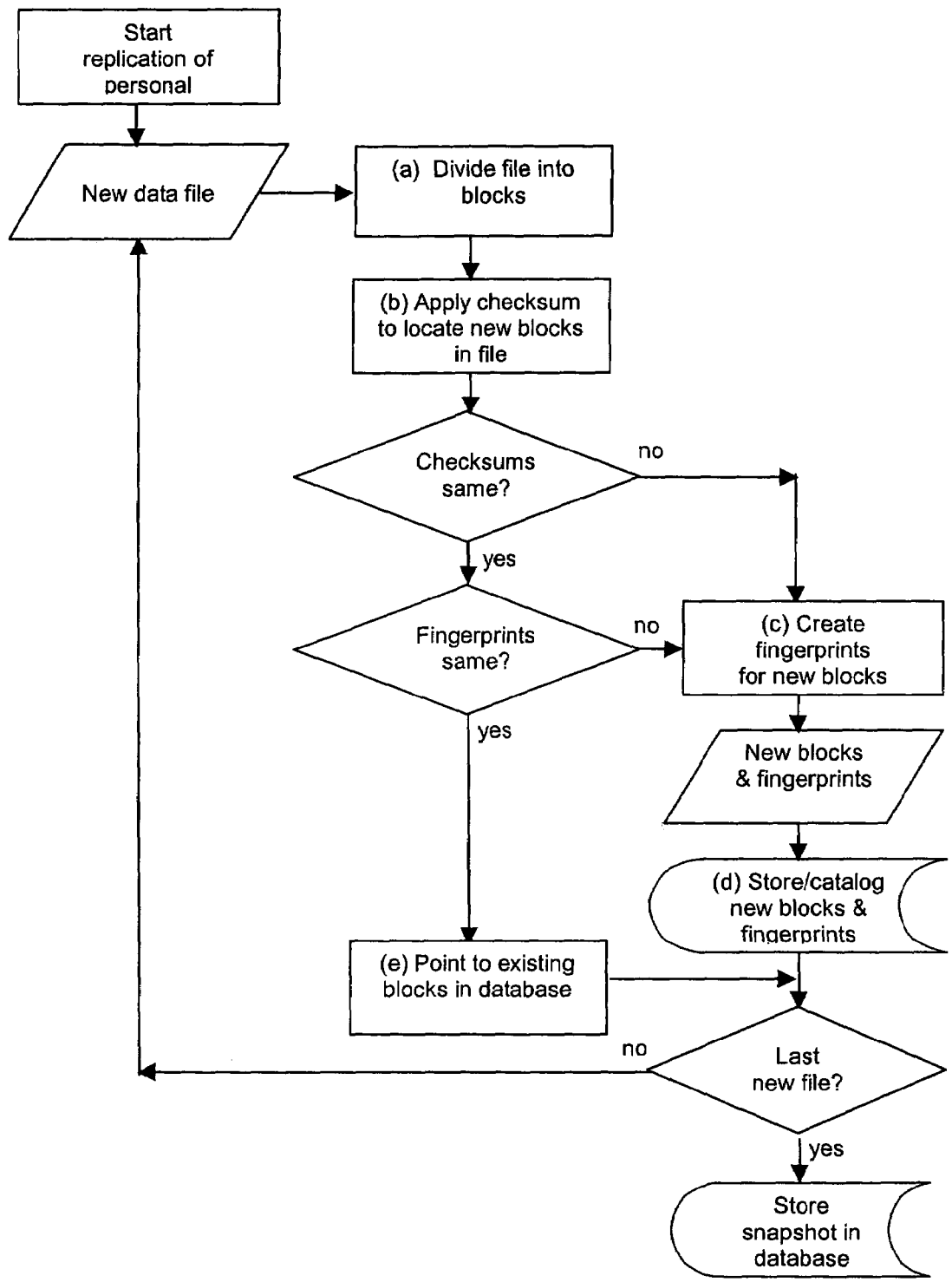
Figure 2. Fingerprint Generation

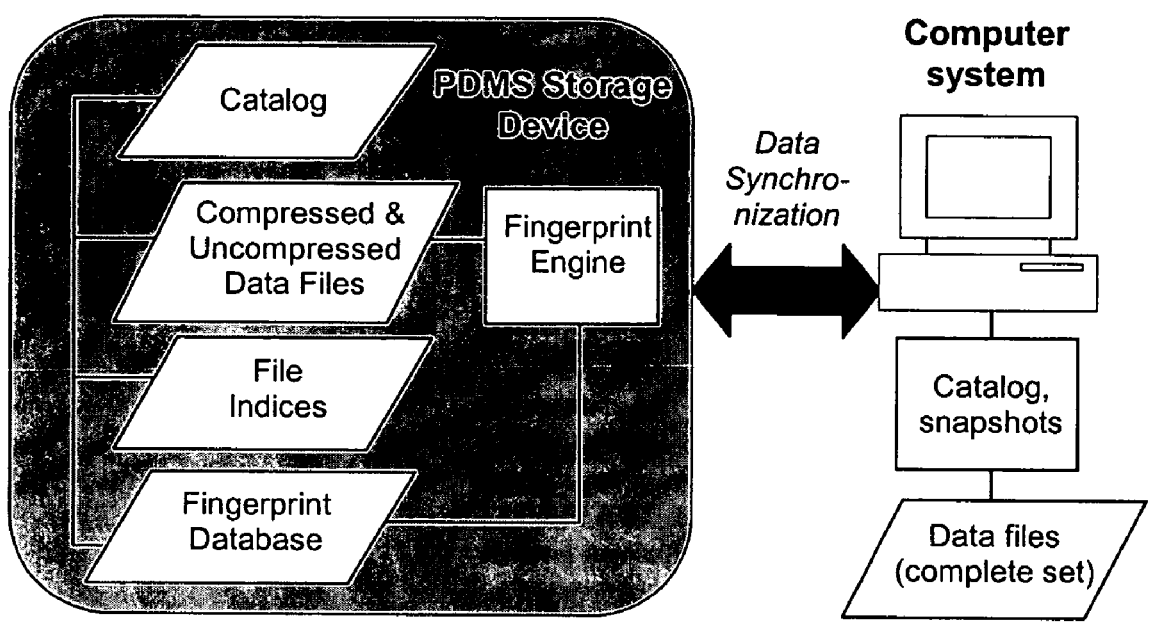
Figure 3. Extended File Storage

Figure 4. Synchronizing Data on Two Computers
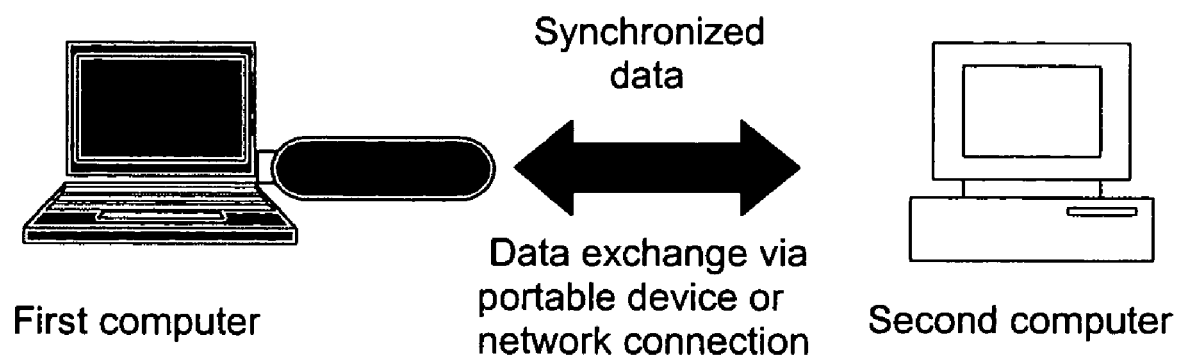

METHOD, SYSTEM, AND PROGRAM FOR PERSONAL DATA MANAGEMENT USING CONTENT-BASED REPLICATION

The present invention claims priority to U.S. provisional application Ser. No. 60/497,938, filed Aug. 26, 2003, the disclosure of which in herein incorporated by reference in its entirety.

FIELD OF INVENTION

The present invention relates to the fields of data management, data storage systems and software used to manage and protect against data loss from unexpected computer system failure.

BACKGROUND

There are few commercially available systems or tools that provide simple and effective management, synchronization, and protection of personal data on a mobile or stationary personal computer system. One reason for this is that mobile computers are portable and do not lend themselves to stationary backup solutions such as storage subsystems or server-based backup solutions. Another reason is that personal data is often user-determined, and do not lend themselves to automated backup methods that protect data by individual storage device or file system. Third, whereas application programs for personal data management, data synchronization, and data protection are readily available, they are usually designed for specific tasks such as backup, replication, or data management, rather than an integrated data management application for operation on a portable storage device. As a result, mobile and stationary computer users have few effective alternatives for personal data management.

Simple data backup programs on portable devices can be implemented easily, but these systems are also inefficient in their use of storage space, and require either larger capacities or removable media to provide ongoing data protection.

Alternatively, protecting data with system-level backup or replication methods is complex as well as time-consuming, since most are designed for operation on a large-scale computer or network. Moreover, these methods often depend on computer infrastructure such as operating system and file system, making them difficult to install and operate for users who are not adept in management and maintenance of computer systems. Storage-conserving backup and remote replication techniques such as snapshots make near-continuous data protection possible, but require system-level software or file system to be installed on the data protection system.

Network backup methods, whether achieved over local-area or wide-area networks, are also problematic. Backup or synchronization using these connections to a remote server require initialization and authentication before the operations can be initiated, adding time and inconvenience, while also restricting mobility. Furthermore, when such operations are conducted over a wide area network with a mobile computer, connection bandwidth is often low, resulting in slow backup and synchronization.

Faced with these impediments, the personal computer user often performs personal data backup and synchronization manually, i.e. on a file-by-file basis, onto a locally attached disk drive or removable medium such as writeable CD, floppy disk, or flash-memory device. The result is that personal data protection is an ad hoc process limited to a few selected files, exposing many computer users to potentially catastrophic loss of their data.

SUMMARY OF THE INVENTION

The present invention provides systems and methods for efficient data storage, management, and back up. In particular, the present invention provides devices, software, and processes for efficient replication of data.

In some embodiments, the present invention provides one or more of:

1. Personal data management and data protection implemented with a computer program installed on a portable storage device.
2. Ability to operate independent of operating system or file system.
3. An integrated system including a combined data management, automatic backup, data snapshots, and data compression program installed on a portable storage device.
4. A system designed for small-scale rather than large-scale data protection.
5. Automated cataloging and backup of data that is initiated upon external connection of a portable storage device. The personal data management system (PDMS) system combines the automatic and operationally transparent capabilities of Java and external peripheral interfaces such as USB or Serial ATA and provides automatic backup or data synchronization.
6. Use of fingerprints to create a unique file block identifier from block-level checksum, message digest, and other metadata such as time stamp, file name, application source, size, and file extension.
7. Data management and data protection based on combined usage of file catalog, fingerprint engine, file indices, fingerprint database, data files, and data compression engines.
8. Use of a combination message-digest and checksum algorithm to effect incremental backup, or snapshot, of personal data files through mathematical reduction of their contents. In additional embodiments, the invention provides one or more of the following features:
    a. Detection of file changes by dividing the file into data blocks and applying a checksum function to compare each block against a database of previously stored blocks.
    b. Byte-by-byte application of a checksum function sequentially through data blocks comprising each file to identify the start and stop points of the data change.
    c. Verification of block-level changes through comparison of message digests for stored data blocks.
9. Use of file block contents rather than a file system block map changes to create a data snapshot.
10. Improvement of snapshot processing efficiency through the application of checksum function to identify block changes prior to use of computationally intensive message digest function to verify the changes.
11. Improvement of snapshot processing efficiency through comparison of message digests of block contents rather than the actual block data.
12. Reduction of required data storage capacity through retention of content-based data snapshots rather than addition of new files.
13. Improvement of compression efficiencies through selection of compression technique matched optimally with file-name extension and associated data type.
14. A computer program that automatically clears portable device storage space for data snapshots as device storage limits are reached. In additional embodiments, the invention provides:

a. User option for snapshot overflow to a second computer or storage device when user-specified storage limits are reached, transferring older snapshot data on a first-in-last-out basis until sufficient storage space is created.

15. Synchronization and retention of catalog and fingerprint data when data files are transferred to a second computer, providing a means by which to verify the integrity of offloaded data files based on message digests rather than actual data.

16. Ease of use through a pre-installed, platform-independent computer program that initiates backup automatically upon insertion of a portable storage device, and continues to backup data incrementally on succeeding connections until user-defined storage limits are reached.

17. Replication of data files based on a content extraction method that enables present and prior versions of the data files to be efficiently stored and retrieved from an application program.

DESCRIPTION OF THE DRAWINGS

FIG. 1 shows a diagram of an exemplary personal data management system device of the present invention configured to operate with a desktop computer.

FIG. 2 shows an exemplary process for generating a fingerprint of the present invention.

FIG. 3 shows an exemplary data synchronization process of the present invention.

FIG. 4 shows an exemplary data management and storage process involving multiple computers.

DEFINITIONS

To facilitate an understanding of the present invention, a number of terms and phrases are defined below:

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the terms "processor" and "central processing unit" or "CPU" are used interchangeably and refer to a device that is able to read a program from a computer memory (e.g., ROM or other computer memory) and perform a set of steps according to the program.

As used herein the term "encode" refers to the process of converting one type of information or signal into a different type of information or signal to, for example, facilitate the transmission and/or interpretability of the information or signal. For example, audio sound waves can be converted into (i.e., encoded into) electrical or digital information. Likewise, light patterns can be converted into electrical or digital information that provides and encoded video capture of the light patterns.

As used herein, the term "client-server" refers to a model of interaction in a distributed system in which a program at one site sends a request to a program at another site and waits for a response. The requesting program is called the "client," and the program that responds to the request is called the "server." In the context of the World Wide Web, the client is a "Web browser" (or simply "browser") that runs on a computer of a user; the program which responds to browser requests by serving Web pages is commonly referred to as a "Web server."

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein the term "security protocol" refers to an electronic security system (e.g., hardware and/or software) to limit access to processor to specific users authorized to access the processor. For example, a security protocol may comprise a software program that locks out one or more functions of a processor until an appropriate password is entered.

As used herein the term "resource manager" refers to a system that optimizes the performance of a processor or another system. For example a resource manager may be configured to monitor the performance of a processor or software application and manage data and processor allocation, perform component failure recoveries, optimize the receipt and transmission of data, and the like. In some embodiments, the resource manager comprises a software program provided on a computer system of the present invention.

As used herein the term "in electronic communication" refers to electrical devices (e.g., computers, processors, communications equipment, etc.) that are configured to communicate with one another through direct or indirect signaling. For example, a computer configured to transmit (e.g., through cables, wires, infrared signals, telephone lines, satellite, etc) information to another computer or device, is in electronic communication with the other computer or device.

As used herein the term "transmitting" refers to the movement of information (e.g., data) from one location to another (e.g., from one device to another) using any suitable means.

As used herein the term "checksum" refers to a count of the number of bits in a transmission unit that is included with the unit so that the receiver can check to see whether the same number of bits arrived. If the counts match, it's assumed that the complete transmission was received. For example, both TCP (Transmission Control Protocol) and UDP (User Datagram Protocol) communication layers provide a checksum count and verification as one of their services.

As used herein the term "message digest" refers to the representation of a block of data in the form of a single string of digits, created, for example, using a formula called a one-way hash function. A hash function takes a long string (or message) of any length as input and produces a fixed length string as output. The output is sometimes termed a "message digest" or "digital fingerprint." Any change to the message, even of a single bit, will (in all probability) result in a dramatically different message digest when re-generated from the received message.

As used herein, the term "fingerprint file" refers to a file that contains data blocks of backup data, with associated fingerprint values.

As used herein, the term "directory snapshot file" refers to a file that contains the structure of the directory at the time of the snapshot. For each snapshot taken, an entry is made to the directory snapshot file to reflect incremental changes from the previous snapshot.

As used herein, the term "indices file" refers to a file that contains mapping between the data block signatures and the data block location in the fingerprint file. New indices are recorded sequentially as snapshots are taken.

As used herein, the term "mapping table" refers to a table that assigns and tracks the data block signature and the offset in the fingerprint file. Preferably, it is structured to optimize the addition and retrieval of fingerprints.

As used herein, the term "last backup log" refers to a file that contains: (i) a list of all the files that existed in the system (the directory) at the time of last snapshot; and (ii) a memory pointer to the associated indices file.

DESCRIPTION OF THE INVENTION

The present invention provides a personal data management system that catalogs, stores and protects data from hard disk failure on a mobile or stationary computer, using a computer program and a portable, externally attached, data storage device such as USB flash memory or hard disk drive. In preferred embodiments, the program uses a combination message-digest and check-function based algorithm to manage and protect data independent of specific computer operating system or file system, thus providing application-level portability for the personal data management system. In preferred embodiments, this program is pre-installed on the portable storage device and is written in a platform-independent language such as Java to provide interoperability with different operating systems. In preferred embodiments, the system catalogs and manages data from a single portable device.

The personal data management system of the present invention, in preferred embodiments, catalogs, stores and protects data from hard disk failure on a mobile or stationary computer, using a computer program and a portable, externally attached, data storage device such as USB flash memory or hard disk drive. In some such embodiments, the program uses a combination message-digest and check-function based algorithm to manage and protect data independent of specific computer operating system or file system, thus providing application-level portability for the personal data management system. In preferred embodiments, this program is pre-installed on the portable storage device and is written in a platform-independent language such as Java to provide interoperability with different operating systems. Preferably, the system catalogs and manages data from a single portable device, even though the data of interest may reside on more than one computer system or memory device. With this system of hardware and software, a complete and verifiable listing of the data and part or all of the data itself can be kept in personal possession or in a secure place, while storing a duplicate set of data elsewhere.

Applications include, but are not limited to portable data back up; management, distribution, and synchronization of personal data between two physically remote computer systems; version-based compression for application programs with repetitive data structure output such as document management, spreadsheet, and database programs; and transfer, management, retention and verification of important personal records such as medical history, legal records, and contracts.

In some embodiments, the invention comprises a personal data management system (PDMS) in which data files on a mobile or stationary computer can be cataloged, searched, stored, and protected from hard disk failure, using a computer program and a single portable, externally attached, data storage device such as flash memory or hard disk drive. An exemplary system is diagrammed in FIG. 1. For the purposes of this description, personal data is defined as an ad hoc set of data files deemed to be of interest to a computer user. The program of the present invention is preferably installed on the portable storage device and is written in a platform-independent language such as Java so that it can be operated on computers with different operating systems using a single data management system. The system automatically backs up, synchronizes, compresses, and catalogs personal data files on a single device, even though the files of interest may reside on more than one computer system.

In some embodiments, the PDMS computer program comprises one or more of: (a) a catalog containing stored files, snapshot and file metadata containing information such as time, date, file size, application source based on file-name extension; (b) compressed and uncompressed user data files; (c) a fingerprint engine that generates a unique set of attributes for each data file based on, for example, data contents, message digest algorithm, and a checksum function; (d) file indices that point to, for example, offset, size, checksum, and message digest data; (e) a fingerprint database containing message digests and changes made to the user data called snapshots.

The PDMS program, combined with a portable storage device with external attachment interface, provides a single, integral system for managing, accessing, verifying, and protecting personal data against failure of a computer or storage system. Applications include, but are not limited to, personal data back up, management and transfer of personal data between two physically remote computer systems, and transfer, management, and retention of important records such as medical history, legal records, and contracts.

In some embodiments, the PDMS duplicates or synchronizes data by first copying the data files of interest from a computer's hard disk, and then updating these files with data snapshots when the PDMS program is invoked and changes are detected in data files. Data snapshots reduce backup time and storage space by backing up only those portions of files that have changed or wholly new files, rather backing up all files whether they have been changed or not.

In some embodiments, to generate snapshots, the PDMS software detects changes in a set of personal files using a checksum and a message digest algorithm. Changes are captured and stored in the form of a content-based snapshot that comprises new data blocks and block-level fingerprints derived from the data contents of each block. Here, the message digest function is used to translate block data of arbitrary length into an integer of fixed length, which is unique to the block contents.

In some embodiments, to detect changes, the PDMS (as exemplified in FIG. 2) creates block-level fingerprints for each file by, for example: (a) dividing new files into fixed length blocks; (b) applying a checksum algorithm for each new block against stored fingerprint data block-by-block to determine whether the file blocks are new or where a change between old and modified files first occurs; (c) upon detecting a changed block, applying the checksum function on a byte-by-byte basis to locate the points at which the file change begins and ends; (d) applying the message digest function to the changed bytes and then recording the message digest and block checksum value in the fingerprint database; (e) when block fingerprints are found to match those already in the fingerprint database, block data is assumed to be the same, and pointers to the common fingerprint data are created; (f) repeating steps (b)-(e) until end of file is reached. Collectively, the message digests and checksums comprise the fingerprints of files in each snapshot. Because these fingerprints are based on data content of each file, they provide identification advantage when files are shared and stored among multiple systems. In such instances, the message-digest based fingerprints offer a superior identification method over file metadata such as time and date stamps, because computer system clocks, especially those on different networks, may differ.

In some embodiments, the PDMS message digest function is achieved with use of a public domain, message-digest algorithm known as MD5 ("The MD5 Message-Digest Algorithm", R. Rivest, Network Working Group, Request for Comments: 1321. MIT Laboratory for Computer Science and RSA Data Security, Inc. April, 1992, herein incorporated by reference in its entirety), although other message digest algorithms may also be used. The MD5, algorithm takes message content of arbitrary length and creates a 128-bit "fingerprint" or message digest of the file content. According to mathematical proof, each digest has a finite, but extremely small chance of creating a duplicate digest for different messages.

In contrast with a conventional file system, the PDMS is an application program that can replicate data by: (a) initiating a snapshot; (b) identifying new data; (c) creating content fingerprints based on new data; (d) creating a content-based snapshot from new data and pointers to previously stored data; (e) recording the fingerprint data with file metadata in the system catalog; and (f) storing these data as a snapshot. These characteristics result in snapshots that are independent from the underlying system data structure. Consequently, moving data from or accessing the data on the portable device requires only the PDMS program, which, unlike a file system, installs easily onto computer system. As an application program, the PDMS can be loaded dynamically into user space memory, and requires no permanently assigned memory space. As a result, it is portable and may be installed on any computer system that supports the PDMS application language.

In preferred embodiments, the PDMS provides integrated, multiple data management functions based on its snapshot and fingerprint architecture. These functions include, for example: (a) creating backup or redundant copies of data using a message-digest algorithm; (b) restoring older version files that are retained as snapshots; (c) reducing storage requirements with data snapshots that eliminate repetitive data; (d) applying data compression technologies based on data types; (e) cataloging stored files and snapshot contents; and (f) providing a symbolic and unique representation of stored data, making it possible to keep a verifiable record of the data on a local storage device without the data itself. This symbolic representation capability not only creates a means by which to extend storage from the portable device onto separate system, but also enables the user to verify the integrity of files that are catalogued on a local device and stored in complete form on a remote computer.

Snapshots and the catalog provide a history of changes made to files and logic by which to reconstruct successive versions of the files, effectively reducing the storage requirements through versioning. Once created, the snapshots and data changes are stored and optionally compressed using any one of several standard data compression techniques. The specific technique is chosen based on the specific data type, as indicated by file extension such as ".txt" or ".jpeg." Using the file extension, an optimal method of compression can be chosen, or sometimes omitted, depending on the effectiveness of snapshots with the compression method. This technique is based on prior work that has shown that data repetition patterns and optimal compression techniques vary with data types ("Feasibility of Data Compression by Eliminating Repeated Data in Practical File Systems. Calicrates Policroniades and Ian Pratt. Computer Laboratory, Cambridge University, Cambridge, UK, CB3 0FD. c 2002, herein incorporated by reference in its entirety).

In some embodiments, in instances where data storage requirements exceed the limits of the portable device, the personal data management system software extends the data file storage to the hard disk of a second computer system as exemplified in FIG. 3. In some embodiments, the software achieves this by clearing a sufficient number of the oldest data files from the portable storage device and transferring them to a second computer to ensure availability of a minimum of storage space for newly added data. The software then synchronizes the catalogs and fingerprint file of the portable storage with the second computer system, creating a single, comprehensive catalog and fingerprint files and attribute files for all personal data on the portable storage device, even though not all data files may be present on the device. Optionally, a password that corresponds to one located on the portable storage device may be embedded in the second computer system's PDMS software to ensure that access can be achieved only when the portable device is attached or access is specifically authorized from the first computer system. Access to the catalog, fingerprint database and data files on the portable device may be password-protected, thereby providing a secure and physically removable data repository that may be kept in personal possession or in a secure place.

The method for synchronizing storage using externally attached storage is the same whether data transfer is effected through intermittent connection of a portable storage device with a first and then, second computer, or through continuous device attachment and network connection between the two computers as exemplified in FIG. 4.

In both cases: (a) software causes personal data to be duplicated between a first computer and its attached storage device, thereby providing a redundant copy to protect the data from device failure; (b) when the capacity of the attached storage device is exceeded, data is copied and periodically synchronized with a second computer of sufficient capacity to store all data. Under both intermittent and continuous network attachment instances, the externally attached storage device provides a catalog and fingerprint files for all personal data files, while storing all or part of the personal data on the device. When only part of the data is stored on the external storage device, a second, complete copy of the personal is then maintained and synchronized with that of a second computer.

In some embodiments, the system is used for large-scale backups. For example, in some embodiments, where the basic PDMS application is used for backup of large-scale storage devices and systems, the time required to complete a snapshot directly is dependent on memory-mapping efficiencies and main memory size of the attached computer system. For large backups, fingerprint file size increases in proportion to backup size. Thus, as fingerprint file size increases, virtual memory usage also increases, extending the time required to complete a snapshot operation.

To accommodate large-scale backups without large degradation of snapshot performance, in some embodiments, the PDMS snapshot processing method is modified to move memory-to-disk management from the computer system to inside the PDMS application itself. Under this modified method, fingerprint checking is limited to fingerprints brought into a memory allotment of fixed size. To optimize performance, the resultant fingerprint information is later reconciled with the totality of snapshot information by a separate process, in which the snapshot directory file and indices are updated. While snapshot data reconciliation requires an additional step to the snapshot process, the increased snapshot performance offsets the requirement for reconciliation and is not inconsistent with backup techniques used for management of large-scale backups.

The snapshot processing steps for large-scale snapshots in some embodiments of the present invention are described below:

1. The file name of the Indices File is recorded for each entry made in the Directory Snapshot File.
2. In addition, recording of all directories and files on the system when the last snapshot was taken along with a pointer to information location contained in the Directory Snapshot File.
3. When a snapshot backup is made for block information not already contained in the PDMS files, a related Indices File is found based on its name in the Directory Snapshot File and loaded into memory or a new one is created and backup is then performed.
4. Each time new block information is encountered during a snapshot, the Indices File is first checked against the Indices File currently in memory, and if not relevant to the new information, a new Indices File is loaded into memory.
5. In the event a single mapping exceeds the maximum permissible size assigned to the Mapping Table, a new entry is made in the Directory Snapshot File and a new Indices File is created. This occurs when a single large file requires more memory than allotted for the Mapping Table maximum. In such case, multiple entries in the Directory Snapshot File are made, but all will point to the same file with different offset.
6. To improve performance and eliminate redundancies created by this internal memory management process, an independent reconciliation process is periodically applied to Fingerprint File. Upon identification of redundancies, the reconciliation process removes the redundancy and updates the indices files accordingly. The process also changes the values and names in the Directory Snapshot File. Changes in the Directory Snapshot files are performed following updates to the Indices File. The reconciliation process is designed to run at times other than when snapshot backup is being performed.
7. In the event an Indices File cannot be located, the PDMS system can recover them by using the Fingerprint File and the Directory Snapshot File and generating a new Indices File. Recovery is achieved by locating the first entry that includes the missing Indices File name, creation of the file, and generation of the Indices File described in Directory Snapshot File.

In some embodiments, this application-based memory management method for snapshots includes the following processing rules and heuristics:

1. The Mapping Table is memory-resident, while the Indices File is maintained on disk. A heuristic rule sets the Mapping Table at two times the size of an Index File.
2. The Index File name is composed of the highest offset in the Fingerprint File at the time the Index File when the first index is added to the Index File.
3. For each entry made in the Directory Snapshot File, an Indices File is created that contains name of the Indices File used when the snapshot for that entry is taken.
4. Each directory or file that is backed up by the PDMS program checks the previously used Indices File name and loads this into memory. If memory limitations make it necessary, the previous Indices File is written to disk and removed from memory.
5. With each snapshot backup taken, the PDMS system modifies the Last Backup Log containing pointers to snapshot files within the Directory Snapshot File. Each snapshot entry contains a pointer to directory structure information within the Directory Snapshot File. If a snapshot entry is made for directory information already contained in the Directory Snapshot File, the new snapshot entry incorporates the existing information. If new snapshot entry information is not already contained in the Directory Snapshot File, new directory entry information. This entry information is generated by searching the Directory Snapshot File, identifying all recent entries, and adding these to a map that describes the new information and previous snapshot directories/files and with corresponding Indices Files. A snapshot entry thus constructed reduces snapshot initialization time and eliminates need to scan the Directory Snapshot file.
6. To maintain memory management within the PDMS application, the Mapping Table that maps data block to finger print values is limited to a fixed size assigned by the application.
7. Multiple indices mapping files are used where each file is limited to one-half the size of the fixed size specified for the Mapping Table.
8. When a Directory Snapshot entry is loaded into memory, the PDMS application finds the matching Indices File by using its name, which is composed of the, offset in the Fingerprint File written in the Directory Snapshot File entry. The corresponding Indices File is determined by selecting the file containing whose name contains the highest value yet is lower than the offset in the entry.
9. On initialization of the program, the Mapping Table starts with its maximum set at half the maximum memory for Mapping Table. As items are added dynamically, the Table is allowed to grow to its maximum fixed size. Each Indices File is represented by a different offset in the Fingerprint File and is set at one-half the maximum Mapping Table memory size. When the Mapping Table reaches its maximum allowable size, the entire Mapping Table flushed or written to disk in two halves. Each half is flushed with corresponding Indices File, which covers half of the indices. By convention, the lower half is then freed from memory, while the upper half remains in memory as the resident Mapping Table.

In some embodiments, the systems and methods of the present invention find use in data recovery following unintended file loss. Applying fingerprint and snapshot technology, the PDMS thus provides a storage-efficient system for computer disaster recovery, i.e., recovery of a computer system the event of disk system failure. When configured for disaster recovery, the PDMS is preferably programmed to restore the computer system to its original operating condition by re-installing two types of data by different means: non-unique data and unique data. Non-unique data files include computer programs such as operating system, application programs, and device drivers; most programs are commercial products are typically distributed and maintained on non-volatile storage media. Unique data files comprise user data from input and program output, and configuration data from system registries and configuration information for each application program; these data are unique and cannot be replicated except from backup copy on a writeable storage device.

Using the PDMS, non-unique data is restored by copying from a reference source such as commercial CD or authorized copy on magnetic disk. In contrast, unique data is restored from the most recent PDMS snapshots of user data and configuration files.

Under the preferred PDMS method of backup and disaster recovery, fingerprints are first created for commonly used commercial computer programs such as operating systems, word processing, spreadsheet, and presentation applications. These fingerprints are incorporated into the PDMS program, which may be updated periodically as new program versions are created and new fingerprints are created. In addition, the PDMS is programmed to recognize registry data and configuration data by file name, enabling the PDMS program to differentiate between configuration and user data.

To protect against disk system failure, the PDMS is used to take snapshots of all data on the computer system to be protected. Programmed accordingly, the PDMS snapshots avoid storage of non-unique data files for which it has fingerprints, thereby significantly reducing backup storage requirements. Recognition of registry and configuration data enables the PDMS program to separate storage of this data from user data when data snapshots are taken. When comprehensive restoration of data or disaster recovery is required for a specific computer system, the PDMS identifies all non-unique data files and either requests restoration by the computer operator or automatically accesses a designated PDMS Internet site and downloads the associated data files. Following this, the PDMS restores registry and configuration data to restore operating and application programs, and then installs user data to effect complete restoration of the computer.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A system for managing data, said system comprising a processor, said processor configured to generate backup data by comparing data from files stored in memory to a previous version of the files stored in the memory, wherein the processor is configured to:
   a) receive data from a data source to be managed, said data source comprising a plurality of different files;
   b) generate data blocks from said data;
   c) generate checksums of said data blocks;
   d) generate a message digest for each of said data blocks;
   e) store the data blocks for all of said plurality of files in a data block collection with corresponding checksums and message digests;
   f) for each of said plurality of different files, create a file descriptor that contains pointers to said data blocks in the data block collection comprising that file;
   g) receive data at a later time point from said data source comprising said plurality of different files;
   h) generate data blocks of said later received data;
   i) generate checksums of said later received data blocks;
   j) generate a message digest for each of said later received data blocks;
   k) for each later received data block generated, compare the checksum and message digest to the checksums and message digests in the data block collection;
   l) for files that only have data block content identical with previously stored data blocks, generate a backup file storing only a fingerprint, metadata, and pointers to identical blocks in the previously stored data block collection;
   m) for files that have non-identical, but overlapping data blocks with previously stored data blocks, generate a backup file storing: i) metadata and pointers to previously stored data blocks in common with the file; and ii) new data blocks that are added to the data block collection, along with pointers to the new data blocks; and
   n) for files that have no data blocks in common with previously stored data blocks, generate a backup file storing: i) file metadata; and ii) new data blocks that are added to the data block collection, along with pointers to the new data blocks.

2. The system of claim 1, wherein software that enables said processor to have functions a)-n) is contained in a portable external storage device.

3. The system of claim 2, wherein said device weighs less than one pound.

4. The system of claim 2, wherein said device weighs less than one ounce.

5. The system of claim 2, wherein said software is configured to function with multiple different operating or file systems.

6. The system of claim 1, wherein said processor is further configured to conduct one or more of functions a)-n) in an automated fashion.

7. The system of claim 2, wherein said processor is activated to carry out one or more of functions a)-n) when said portable external storage device is connected to a computer containing said data.

8. The system of claim 1, wherein said metadata is selected from the group consisting of time stamp, file name, application source, size, and file extension.

9. The system of claim 1, wherein said processor is further configured to compress said data.

10. The system of claim 1, wherein functions l)-n) comprise detection of file changes of a plurality of said data blocks by applying said checksum function to compare each block against a database of previously stored blocks associated with said data.

11. The system of claim 10, wherein functions l)-n) comprise application of said checksum function sequentially through data blocks to identify start and stop points of any identified data changes.

12. The system of claim 11, wherein functions l)-n) comprise verification of block-level changes through comparison of message digests for stored data blocks.

13. The system of claim 1, wherein said processor is configured to carry out function l) prior to function m) or n), wherein function m) or n) is not conducted if no changes are identified in the use of function l).

14. The system of claim 2, wherein said software is configured to store information in a catalogue on two or more separate computers.

15. A method of data management comprising the steps of:
   a) connecting a storage device to a computer housing a processor;
   b) initiating a data management process for managing a data source comprising a plurality of different files;
   c) receiving data, from said data source to be managed, into said processor;
   d) generating data blocks from said data for all of a plurality of files stored on said computer;
   e) generating checksums of said data blocks;

f) generate a message digest for each of said data blocks;
g) storing said data blocks for all of said plurality of files in a data block collection with corresponding checksums and message digests, with pointers indicating which of said data blocks is associated with individual files within said plurality of files;
h) receiving data from said computer at later time point;
i) generating data blocks of said later received data;
j) generating checksums of said later received data blocks;
k) generating a message digest for each of said later received data blocks;
l) for each later received data block generated, comparing the checksum and message digest to the checksums and message digests in the data block collection;
m) for files that only have data block content identical with previously stored data blocks, generating a backup file storing only a fingerprint, metadata, and pointers to identical blocks in the previously stored data block collection;
n) for files that have non-identical, but overlapping data blocks with previously stored data blocks, generating a backup file storing: i) metadata and pointers to previously stored data blocks in common with the file; and ii) new data blocks that are added to the data block collection, along with pointers to the new data blocks; and
o) for files that have no data blocks in common with previously stored data blocks, generating a backup file storing: i) file metadata; and ii) new data blocks that are added to the data block collection, along with pointers to the new data blocks.

* * * * *